United States Patent
Oelsner (10) Patent No.: US 10,357,758 B2
(45) Date of Patent: Jul. 23, 2019

(54) METHOD OF PRE-TREATING AN ADSORBENT FOR A CHROMATOGRAPHIC SEPARATION

(71) Applicant: NORDION (CANADA) INC., Ottawa, ON (CA)

(72) Inventor: Steve Oelsner, Ottawa (CA)

(73) Assignee: BWXT ITG CANADA, INC., Ontario (CA)

(*) Notice: Subject to any disclaimer, the term of this patent is extended or adjusted under 35 U.S.C. 154(b) by 15 days.

(21) Appl. No.: 13/707,824

(22) Filed: Dec. 7, 2012

(65) Prior Publication Data

US 2013/0220928 A1    Aug. 29, 2013

Related U.S. Application Data

(60) Provisional application No. 61/568,524, filed on Dec. 8, 2011.

(51) Int. Cl.

| | |
|---|---|
| *B01J 20/30* | (2006.01) |
| *B01D 15/20* | (2006.01) |
| *B02C 23/08* | (2006.01) |
| *G21G 1/00* | (2006.01) |
| *B01J 20/06* | (2006.01) |
| *B01J 20/08* | (2006.01) |
| *B01J 20/282* | (2006.01) |

(Continued)

(52) U.S. Cl.
CPC .......... *B01J 20/3021* (2013.01); *B01D 15/20* (2013.01); *B01D 15/203* (2013.01); *B01J 20/06* (2013.01); *B01J 20/08* (2013.01); *B01J 20/103* (2013.01); *B01J 20/282* (2013.01); *B01J 20/283* (2013.01); *B01J 20/284* (2013.01); *B02C 23/08* (2013.01); *G21G 1/001* (2013.01); *G21G 2001/0021* (2013.01); *G21G 2001/0031* (2013.01); *G21G 2001/0042* (2013.01); *G21G 2001/0057* (2013.01); *G21G 2001/0073* (2013.01); *G21G 2001/0084* (2013.01)

(58) Field of Classification Search
None
See application file for complete search history.

(56) References Cited

U.S. PATENT DOCUMENTS

| | | | |
|---|---|---|---|
| 3,576,998 | A | 5/1971 | Deutsch |
| 4,239,970 | A | 12/1980 | Eckhardt et al. |

(Continued)

OTHER PUBLICATIONS

Capote, P.F. Analytical Applications of Ultrasound. 2006. p. 77-79.*

(Continued)

*Primary Examiner* — Kara M Peo
(74) *Attorney, Agent, or Firm* — J.A. Lindeman & Co. PLLC; Aaron Raphael; Jeffrey Lindeman (57) ABSTRACT

A method of treating an adsorbent for a chromatographic separation. The method involves sonicating particles of an inorganic metal oxide having fragile edges in the absence of any alkylating or acylating agent to form smoothened particles of the inorganic metal oxide and washing the smoothened particles of the inorganic metal oxide to remove fine particulate matter to produce a treated adsorbent. The treated adsorbent can be used in a method of isolating a daughter radioisotope from a daughter radioisotope that is produced from the parent radioisotope by radioactive decay.

22 Claims, 5 Drawing Sheets

(51) Int. Cl.
   *B01J 20/283*    (2006.01)
   *B01J 20/284*    (2006.01)
   *B01J 20/10*     (2006.01)

(56) References Cited

U.S. PATENT DOCUMENTS

| | | | |
|---|---|---|---|
| 4,264,468 | A | 4/1981 | Neirinckx et al. |
| 4,330,507 | A | 5/1982 | Lewis |
| 4,333,911 | A | 6/1982 | Comar et al. |
| 4,859,431 | A | 8/1989 | Ehrhardt |
| 4,919,804 | A | 4/1990 | Dorsey et al. |
| 7,592,605 | B2 | 9/2009 | Weisner et al. |
| 7,700,926 | B2 | 4/2010 | Tartaglia et al. |
| 7,792,406 | B2 | 9/2010 | Kambe et al. |
| 2002/0009414 | A1* | 1/2002 | Moser et al. ............... 423/604 |
| 2007/0031329 | A1 | 2/2007 | Velikyan et al. |
| 2010/0266487 | A1 | 10/2010 | Torardi |

OTHER PUBLICATIONS

Klaus K. Unger et al.; Particle Packed Columns and Monolithic Columns in High-Performance Liquid Chromatography-Comparison and Critical Appraisal; Journal of Chromatography A, 1184, pp. 393-415 (2008).

Johannes P.C. Vissers et al.; Comparison of Spherically and Irregularly Shaped Stationary Phase Packings in Microcolumn Liquid Chromatography; J. Microcolumn Separations, 7(3), pp. 239-245 (1995).

Kenneth S. Suslick; The Chemical Effects of Ultrasound; Scientific American, pp. 80-86 (1989).

International Search Report PCT/CA2012/001117 dated Mar. 20, 2013.

Written Opinion of the International Searching Authority dated Mar. 20, 2013.

Agnes Pottier et al., "Size Tailoring of TiO2 Anatase Nanoparticles in Aqueous Medium and Synthesis of Nanocomposites. Characterization by Raman Spectroscopy", J. Mater. Chem., 13: 877-882 (2003).

Richard M. Lambrecht, "Radionuclide Generators", Radiochimica Acta 34: 9-24 (1983).

Rubel Chakravarty et al., "Development of a Nano-Zirconia Based 68Ge/68Ga Generator for Biomedical Applications", Nuclear Medicine and Biology, 1-9 (2010).

Rubel Chakravarty et al., "Nanocrystalline Zirconia: A Novel Sorbent for the Preparation of 188W/188Re Generator", Applied Radiation and Isotopes, 68: 229-238 (2010).

Office Action dated Jul. 20, 2015, issued in Canadian Application No. 2,854,820.

Notice of Allowance dated Feb. 17, 2016, issued in Canadian Application No. 2,854,820.

* cited by examiner

METHOD OF PRE-TREATING AN ADSORBENT FOR A CHROMATOGRAPHIC SEPARATION

CROSS-REFERENCE TO RELATED APPLICATION

This non-provisional application claims the benefit of U.S. Provisional Patent Application No. 61/568,524, filed on Dec. 8, 2011. The disclosure of the prior application is hereby incorporated herein in its entirety by reference.

FIELD OF THE INVENTION

The present invention provides a method of pre-treating an adsorbent for use in a chromatographic separation. In particular, the present invention relates to a method of pre-treating a metal oxide absorbent for use in separating a daughter radioisotope from a parent radioisotope.

BACKGROUND OF THE INVENTION

Radionuclide generators are commonly used for the isolation of a daughter radioisotope from a parent radioisotope based on differences in the adsorption of the two radionuclides to an adsorbent in the presence of an eluting solvent. A problem associated with the adsorbents used in these generators is that they have fragile edges that tend to flake off as a powder during elution of the desired daughter radionuclide, and clog a filtration membrane located at the distal end of the chromatography column in which the adsorbent is disposed. As a result, the performance of the generator becomes significantly impeded. Furthermore, as the parent radionuclide may be adsorbed to the powder that is formed during elution of the daughter radioisotope, the purity of the eluted daughter radionuclide may be significantly compromised.

There is therefore a need for a method of pre-treating particles of an adsorbent used in radionuclide generators, which removes the fragile edges disposed along the periphery of the particles, to improve the performance of the radionuclide generators and increase the purity of the daughter radionuclide eluted from the generators.

SUMMARY OF THE INVENTION

The present invention provides a method of pre-treating an adsorbent for use in a chromatographic separation. In particular, the present invention relates to a method of pre-treating a metal oxide absorbent for use in separating a daughter radioisotope from a parent radioisotope.

In a first aspect, the present invention provides a method of treating an adsorbent for a chromatographic separation, comprising:

sonicating particles of an inorganic metal oxide having fragile edges in the absence of any alkylating or acylating agent to form smoothened particles of the inorganic metal oxide;

washing the smoothened particles of the inorganic metal oxide to remove fine particulate matter, thereby producing a washed, treated adsorbent.

In a second aspect, the present invention provides a method of isolating a daughter radioisotope from a parent radioisotope, the daughter radioisotope produced from the parent radioisotope by radioactive decay, the method comprising:

adsorbing the parent radioisotope onto particles of an inorganic metal oxide, in particular irregularly-shaped particles of the inorganic metal oxide, having a smoothened surface to produce inorganic metal oxide particles comprising adsorbed parent radioisotope;

allowing a portion of the parent radioisotope to decay to the daughter radioisotope, and eluting a solution of the daughter radioisotope from the inorganic metal oxide particles comprising adsorbed parent radioisotope, thereby isolating the daughter radioisotope from the parent radioisotope.

In a third aspect, the present invention provides a method of isolating a daughter radioisotope from a parent radioisotope, the daughter radioisotope produced from the parent radioisotope by radioactive decay, the method comprising:

sonicating particles of an inorganic metal oxide having fragile edges in the absence of any alkylating or acylating agent to form smoothened particles of the inorganic metal oxide;

washing the smoothened particles of the inorganic metal oxide to remove fine particulate matter, and using the washed, smoothened particles of the inorganic metal oxide to isolate the daughter radioisotope from the parent radioisotope.

In a fourth aspect, the present invention provides a method of isolating a compound of interest from a crude sample, comprising:

sonicating particles of an inorganic metal oxide having fragile edges in the absence of any alkylating or acylating agent to form smoothened particles of the inorganic metal oxide;

washing the smoothened particles of the inorganic metal oxide to remove fine particulate matter, and using the washed, smoothened particles of the inorganic metal oxide to isolate the compound of interest from the crude sample.

In a fifth aspect, the present invention provides a composition comprising irregularly-shaped particles of an inorganic oxide having a smoothened surface.

In a sixth aspect, the present invention provides a chromatographic column for isolating a compound of interest, the chromatographic column packed with spherically-shaped or irregularly-shaped particles of an inorganic oxide having a smoothened surface, and comprising an inlet for an eluent and an outlet for an eluate.

The method of treating an adsorbent of the first aspect of the present invention is generally useful for the preparation of different types of column packings, such as packings for a chromatography column of an HPLC system or a radionuclide generator. This method produces a metal oxide adsorbent having improved mechanical stability, which can form more homogeneous column packings, and require a reduced pressure for eluting compounds during a chromatographic separation. The particles of the metal oxide adsorbent produced by the methods of the present invention can also result in lower breakthrough of a parent radionuclide during the chromatographic separation of a daughter radionuclide from the parent radionuclide and reduced plugging of the chromatography column used in the chromatographic separation as a result of the reduction in fine particulate matter derived from the particles of the adsorbent.

BRIEF DESCRIPTION OF THE DRAWINGS

These and other features of the invention will become more apparent from the following description in which reference is made to the appended drawings wherein.

DETAILED DESCRIPTION OF THE INVENTION

The present invention provides a method of pre-treating an adsorbent for use in a chromatographic separation. In particular, the present invention relates to a method of pre-treating a metal oxide absorbent for use in separating a daughter radioisotope from a parent radioisotope.

The present invention relates to a method of treating an adsorbent for a chromatographic separation, comprising:
sonicating particles of an inorganic metal oxide having fragile edges in the absence of any alkylating or acylating agent to form smoothened particles of the inorganic metal oxide, and washing the smoothened particles of the inorganic metal oxide to remove fine particulate matter, thereby producing a treated adsorbent.

The present invention also relates to a composition comprising irregularly-shaped particles of an inorganic oxide having a smoothened surface. In one example, the inorganic metal oxide in the composition can have a particle size of from about 10 μm to about 300 μm, or any value or sub-range therebetween. In another example, the particles have been pre-baked at a temperature of from about 400-600° C., or any value or sub-range therebetween, for about 1 to about 2 hours.

The particles of the inorganic metal oxide prepared according to the treatment method of the present invention can generally be used to isolate a compound of interest from a crude sample, or isolate a daughter radioisotope from a parent radioisotope.

Accordingly, the present invention provides a method of isolating a compound of interest from a crude sample, or a daughter radioisotope from a parent radioisotope, the method comprising:

I) adsorbing the parent radioisotope onto particles of an inorganic metal oxide, in particular, irregularly-shaped particles of an inorganic metal oxide, having a smoothened surface, to produce inorganic metal oxide particles comprising adsorbed parent radioisotope;

allowing a portion of the parent radionuclide to decay to the daughter radionuclide, and eluting a solution of the daughter radioisotope from the inorganic metal oxide particles comprising adsorbed parent radioisotope, thereby isolating the daughter radioisotope from the parent radioisotope; or II) adsorbing the crude sample onto particles of an inorganic metal oxide, in particular, irregularly-shaped particles of an inorganic metal oxide, having a smoothened surface, to produce inorganic metal oxide particles comprising adsorbed crude sample, and eluting a solution of the compound of interest from the inorganic metal oxide particles comprising adsorbed crude sample, thereby isolating the compound of interest from the crude sample.

In another aspect, the present invention provides a method of isolating a compound of interest from a crude sample, or a method of isolating a daughter radioisotope from a parent radioisotope, which comprises:

sonicating particles of an inorganic metal oxide having fragile edges in the absence of any alkylating or acylating agent to form smoothened particles of the inorganic metal oxide;

washing the smoothened particles of the inorganic metal oxide to remove fine particulate matter, and using the washed, smoothened particles of the inorganic metal oxide to isolate the compound of interest from the crude sample or the daughter radioisotope from the parent radioisotope.

In one example, the step of using comprises:

I) adsorbing the parent radioisotope onto the washed, smoothened particles of the inorganic metal oxide to produce inorganic metal oxide particles comprising adsorbed parent radioisotope;

allowing a portion of the parent radionuclide to decay to the daughter radionuclide, and eluting a solution of the daughter radioisotope from the inorganic metal oxide particles comprising adsorbed parent radioisotope, thereby isolating the daughter radioisotope from the parent radioisotope; or II) adsorbing the crude sample onto the washed, smoothened particles of the inorganic metal oxide to produce inorganic metal oxide particles comprising adsorbed crude sample, and eluting a solution of the compound of interest from the inorganic metal oxide particles comprising adsorbed crude sample, thereby isolating the compound of interest from the crude sample.

In another example, the step of using comprises:

I) adsorbing the parent radioisotope onto a packed layer of the washed, smoothened particles of the inorganic metal oxide to produce a packed layer of inorganic metal oxide particles comprising adsorbed parent radioisotope;

allowing a portion of the parent radionuclide to decay to the daughter radionuclide, and eluting a solution of the daughter radioisotope from the packed layer of the inorganic metal oxide particles comprising adsorbed parent radioisotope, thereby isolating the daughter radioisotope from the parent radioisotope; or II) adsorbing the crude sample onto a packed layer of the washed, smoothened particles of the inorganic metal oxide to produce a packed layer of inorganic metal oxide particles comprising adsorbed crude sample, and eluting a solution of the compound of interest from the packed layer of the inorganic metal oxide particles comprising adsorbed crude sample, thereby isolating the compound of interest from the crude sample.

The washed, smoothened particles produced according to the treatment method of the present invention can be used to form a packed sorbent layer within a chromatography column that forms part of a generator for eluting a daughter radioisotope from a parent radioisotope. Examples of radioisotope generators that can be used in the methods of the present invention are described in U.S. Pat. Nos. 7,700,926 and 7,091,494, the disclosures of which are incorporated by reference herein.

Figure 1:
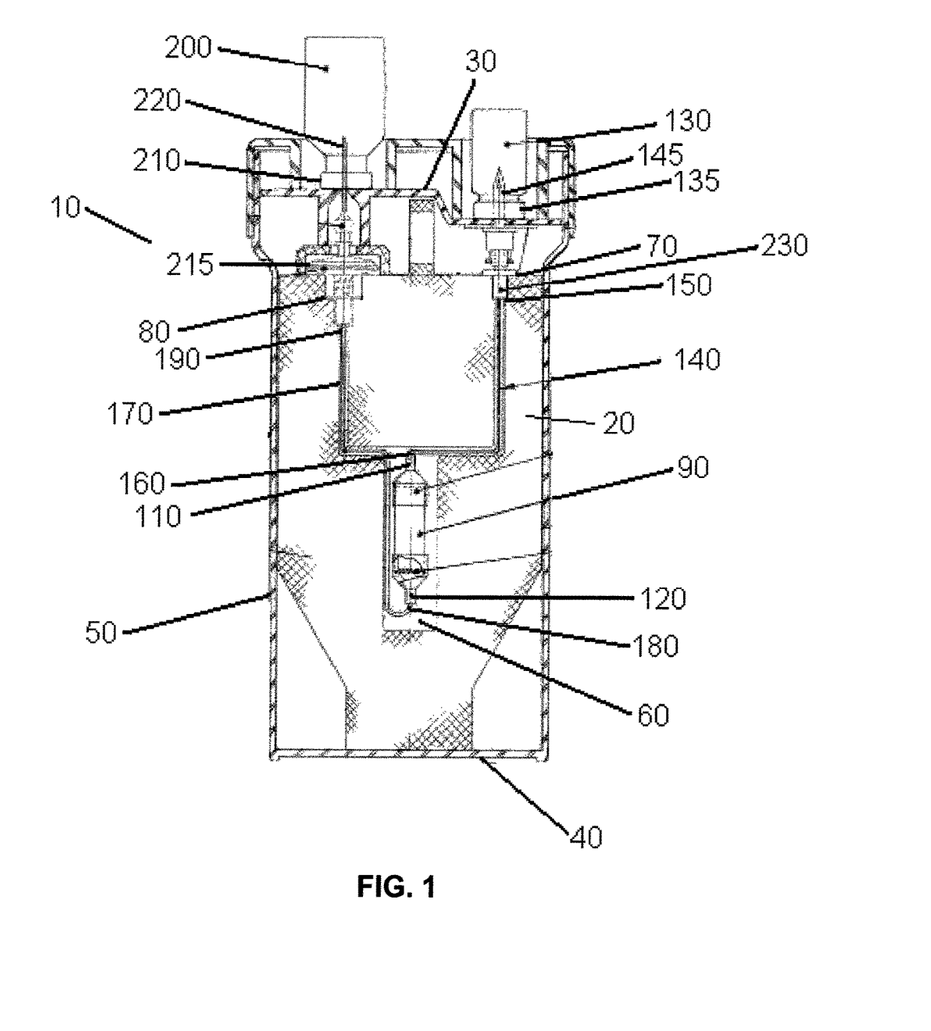
FIG. 1 illustrates an example of a radioisotope generator that can be used in the method of isolating a daughter radioisotope according to the present invention.

FIG. 1 illustrates an example of a radioisotope generator 10 that can be used in the method of isolating a daughter radioisotope of the second and the third aspects of the present invention, which includes a housing having a first end 30, a second end 40, and a wall 50 extending between the first end and the second end. The housing has an internal volume 60 and a surface that comprises an entry port 70 and an exit port 80. A chromatography column 90 is disposed within the internal volume 60 of the housing, which is packed with spherically-shaped or irregularly-shaped particles of inorganic metal oxide particles, which have a smoothened surface prepared according to the treatment method of the present invention and are loaded with the parent radioisotope of the daughter radioisotope. The chromatography column 90 is surrounded by a radiation shield 20 formed of lead, tungsten or depleted uranium.

The chromatography column 90 includes an inlet 110 for an eluent for eluting the daughter radioisotope from the parent radioisotope and an outlet 120 for an eluate containing the daughter radioisotope.

The radioisotope generator 10 includes a fluid reservoir 130 having a septum 135 and containing a supply of eluent, which is connected to a first fluid conduit 140 having an inlet 150 and an outlet 160. The outlet 160 of the first fluid conduit 140 is connected to and extends from the inlet 110 of the chromatography column 90 to the entry port 70 of the generator 10. The inlet 150 of the first fluid conduit 140 is attached to a hollow, elongate spike body 145 in fluid communication with the first fluid conduit 140, which has a pointed end capable of piercing the septum 135 of the fluid reservoir 130. The outlet of the chromatography column 90 is connected to a second fluid conduit 170 having an inlet 180 and an outlet 190. The inlet 180 of the second fluid conduit 170 is connected to and extends from the outlet 120 of the chromatography column 90 to the exit port 80 of the generator 10.

The radioisotope generator may also include a container 200, such as an evacuated container, for collecting the eluate from the chromatography column 90. The outlet 190 of the second fluid conduit 170 may be attached to a needle 220 for piercing the closure 210 of the container 200. A filter 215 (such as a 0.45 micron filter) may also be connected between the outlet 190 of the second fluid conduit 170 and the needle 220 to remove particulate matter. The container 200 is optionally disposed within a radiation shielding material (not shown).

The reservoir 130 contains a supply of eluent and includes an outlet 230 for delivery of the eluent to the inlet 150 of the first fluid conduit 140 and optionally an air inlet (not shown) that allows air from the atmosphere to apply pressure to eluent in the reservoir.

The eluent is forced through the chromatography column using either an evacuated container as the container 200, or by applying a positive pressure to the supply of the eluent in the reservoir 130, or both.

The present invention, therefore provides a chromatographic column for eluting a daughter radioisotope from a parent radioisotope, the chromatographic column packed with spherically-shaped or irregularly-shaped particles of an inorganic oxide having a smoothened surface and comprising an inlet for an eluent for eluting the daughter radioisotope from the parent radioisotope and an outlet for an eluate comprising the daughter radioisotope. The irregularly-shaped particles of an inorganic oxide having a smoothened surface can be loaded with the parent radioisotope.

More particularly, the present invention provides a generator for eluting a daughter radioisotope from a parent radioisotope and for collecting an eluate comprising the daughter radioisotope in a container, the system comprising:

a housing comprising a radiation shield, the housing having a first end, a second end, and a wall extending between the first end and the second end, and the housing having both an internal volume and a surface that comprises an entry port and an exit port;

a chromatographic column disposed within the internal volume of the housing and enclosed within the radiation shield, the chromatographic column comprising spherically-shaped or irregularly-shaped particles of an inorganic oxide having a smoothened surface, the spherically-shaped or irregularly-shaped particles of the inorganic oxide being loaded with the parent radioisotope, the chromatographic column having an inlet for an eluent for eluting the daughter radioisotope from the parent radioisotope and an outlet for the eluate comprising the daughter radioisotope;

a first fluid conduit having an inlet and an outlet, the outlet of the first fluid conduit connected to and extending from the inlet of the chromatographic column to or through the entry port of the housing;

a second fluid conduit having an inlet and an outlet, the inlet of the second fluid conduit connected to and extending from the outlet of the chromatographic column to or through the exit port of the housing, and a reservoir for holding a supply of eluent, the reservoir having an outlet in fluid communication with the inlet of the first fluid conduit and optionally an air inlet for admission of air from the atmosphere to apply atmospheric air pressure to eluent in the reservoir.

The generator may further comprise a container having a pierceable closure, for collecting the eluate from the chromatographic column, and a needle connected to the outlet of the second fluid conduit, wherein the closure of the container is pierced by the needle. The container can be disposed external to the housing or within a radiation shielding material.

The particles of the inorganic metal oxide can be sonicated in the preparation methods of the present invention for a period of about 1 to about 4 hours or any value or subrange therebetween, or for a period of about 1 to about 2 hours or any value or subrange therebetween.

The solvent used to contain the particles of the metal oxide in the sonication step of the treatment method of the present invention can be one that is capable of conducting ultrasonic waves and is chemically inert to the particles of the metal oxide. Non-limiting examples of such a solvent include without limitation aqueous solutions, such as neutral aqueous solutions, acidic aqueous solutions or basic aqueous solutions; alcohols, such as methanol, ethanol, propanol or isopropanol; and aqueous alcoholic solutions, such as aqueous ethanol solutions or aqueous propanol solutions. Other examples of suitable solvents can be readily determined by one of skill in the art without the use of undue experimentation.

The treatment method of the present invention may optionally include a step of washing the particles of the inorganic metal oxide to remove fine particulate matter prior to the step of sonicating the particles of the metal oxide.

The solvent used for washing the particles of the metal oxide or the smoothened particles of the metal oxide may be the same as the one used to contain the particles of the metal oxide in the sonication step, or another solvent that is chemically inert to the particles of the metal oxide or the smoothened particles of the metal oxide and is easily visually decanted.

The adsorbent of the present invention can have a particle size of from about 10 μmm to about 300 μm or any value or subrange therebetween, from about 30 μm to about 100 μm or any value or subrange therebetween, from about 30 μm to about 60 μm or any value or subrange therebetween, from about 50 μm to about 300 μm or any value or subrange therebetween, or from about 100 μm to about 250 μm or any value or subrange therebetween.

The methods of preparing the adsorbent according to the present invention can optionally include a step of baking the particles of the inorganic metal oxide having fragile edges or the washed, smoothened particles of the inorganic metal oxide at a temperature of from about 400 to about 600° C. or any value or subrange therebetween, such as 400° C., 500° C. or 600° C. for about 1 to about 2 hours or any value or subrange therebetween. The baking step ensures that the inorganic metal is present predominantly in one form of crystal type. For example, baking particles of titania at a temperature of from about 400 to about 600° C. will produce particles of titania in predominantly the anatase form (see FIG. 3).

The particles of the inorganic metal oxide used in the methods of the present invention can be spherically-shaped or irregularly-shaped.

Examples of the inorganic metal oxide that can be used in the methods of the present invention include, without limitation, titanium oxide (titania), in particular brookite titania, anatase titania, or rutile titania; aluminum oxide; tin oxide; zirconium oxide or silicon dioxide.

In examples of the method of isolating a daughter radioisotope of the second aspect and the third aspect of the present invention, the parent radioisotope/daughter radioisotope pair are $^{68}Ge/^{68}Ga$, $^{82}Sr/^{82}Rb$, $^{99}Mo/^{99m}Tc$, $^{188}W/^{188}Re$, $^{62}Zn/^{62}Cu$, $^{113}Sn/^{113m}In$, $^{228}Th/^{212}Bi$ or $^{225}Ac/^{221}Fr$. Other examples of radionuclides that can be isolated using the adsorbent of the present invention are described in Lambrecht, R. M. *Radiochimica Acta* 34, 9-24 (1983), the disclosure of which is incorporated by reference herein.

The particles of the metal oxide can be sonicated by either immersing a reaction vessel containing the particles into the liquid of a common laboratory ultrasonic cleaning bath or by introduction of an ultrasonic generating probe directly into the reaction medium. The ultrasonic frequency used in the step of sonication can be from 20 kHz to 10 MHz or any value or subrange therebetween, or from 20 kHz to 60 kHz or any value or subrange therebetween. In another example, the ultrasonic frequency used in the step of sonication is 40 kHz.

The particular solvent system used to elute a compound of interest, such as a daughter radionuclide, can be readily determined by one of skill in the art. Examples of specific solvent systems that can be used to elute typical daughter radionuclides are described in Saha, G. B., 1998 "Radionuclide Generators" in *Fundamentals of Nuclear Pharmacy*, 4$^{th}$ Edition, Springer, pp. 65-79, the disclosure of which is incorporated by reference herein.

EXAMPLES

The following example is of a method used to prepare irregularly-shaped anatase crystals of titania for use in isolating a daughter radioisotope from a parent radioisotope.
Crystallization Process Into a 1000 mL clean Teflon bottle containing 11.7 g conc HCl was pipetted 10×1 mL aliquots of TiCl$_4$ (Alpha Aesar A470-500). The sides of the Teflon bottle were washed with 20 mL of water and the contents of the bottle were swirled to ensure there was no material remaining on the sides of the bottle. The lid of the bottle was tightened and the contents of the bottle were swirled with the bottle being upside down. The bottle was then immediately turned upright and the lid of the bottle was loosened to release any built up pressure. The resulting solution was clear and colourless.

The Teflon bottle containing the solution of TiCl$_4$ was placed on an orbital shaker and secured. A solution of NH$_4$OH (54 g NH$_4$OH/200 mL water) was pumped through pre-rinsed Tefzel tubing at a rate of one drop every five seconds into the Teflon bottle containing the TiCl$_4$ solution over a period of 4-6 hours with the orbital shaker set at 150 rpm.
Drying & Filtration Process A borosilicate sintered filter (medium porosity) was prepared by soaking it in 1N HCl overnight, rinsing it with distilled water and allowing it to dry.

The titania reaction mixture was filtered through the sintered filter by vacuum without allowing the white cake of titania that was formed to dry out or crack. The filter cake was then washed ten times with 20 mL water just until the water disappeared from the cake, and any remaining water in the cake was drawn out by vacuum. The filter cake was then placed into a furnace to dry overnight at 150° C., and was then baked at 400° C. for 2 hours. The resulting filter cake was yellow in colour.
Sieving Process The filter containing the dried titania was removed from the furnace and allowed to cool to room temperature. The dried titania was then ground and sieved to a particle size range of from 38 to 53 microns.
Removing Particulate Material In order to remove fine particulate material, a solution of 0.1 N HCl was added to the ground titania and the supernatant decanted. This procedure was repeated several times until no further particulate material could be detected.
Sonication The washed titania material was then sonicated for 2 hours in 10 to 15 mL of 0.1 N HCl. Fine particulate material was then removed using the procedure detailed above.
Drying Process The sonicated material was then dried in an open Teflon bottle in a beaker covered with a watch glass in a furnace at approximately 150° C. The dried material was then transferred into a quartz dish, covered and baked at 500° C. for 60 minutes to produce anatase titania as a material having a beige colour. The baked material was then sieved using a 38μ sieve for one minute.

The above procedure produced about 3 g of anatase titania.

Figure 2A:
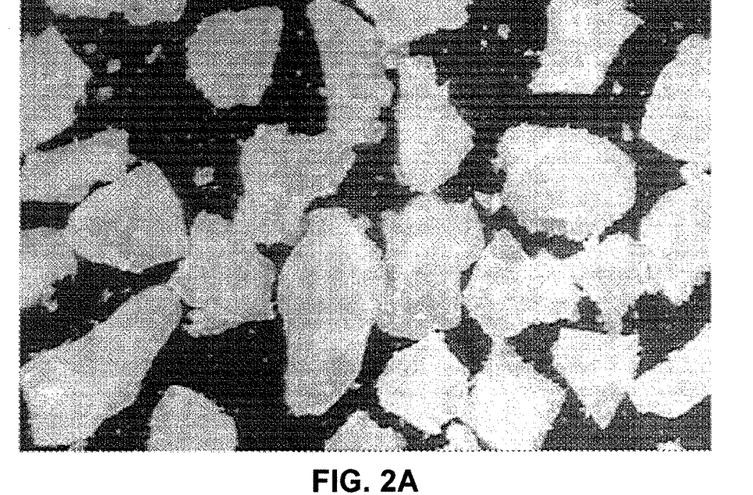
FIG. 2A illustrates an electron micrograph of irregularly-shaped particles of titania having fragile edges, which have been sieved to a particle size of 150 to 250 microns.
Figure 2B:
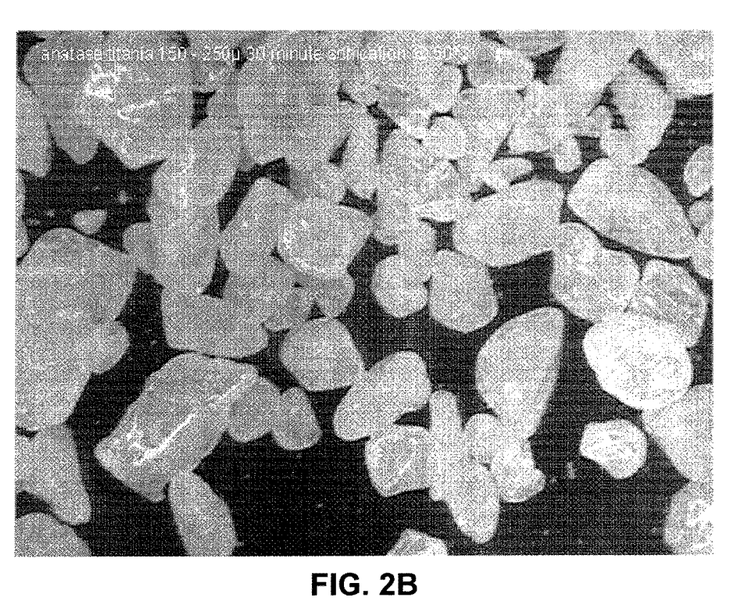
FIG. 2B illustrates an electron micrograph of irregularly-shaped particles of titania having smoothened edges produced by treating the particles shown in FIG. 2A with the sonication step of the treatment method of the present invention.

FIG. 2A illustrates an electron micrograph of irregularly-shaped particles having fragile edges, which can be used as a substrate for the treatment method of the present invention. After being treated according to the treatment method of the present invention, the fragile edges of the irregularly-shaped particles have been removed to leave behind smoothened edges (see FIG. 2B).

Figure 3:
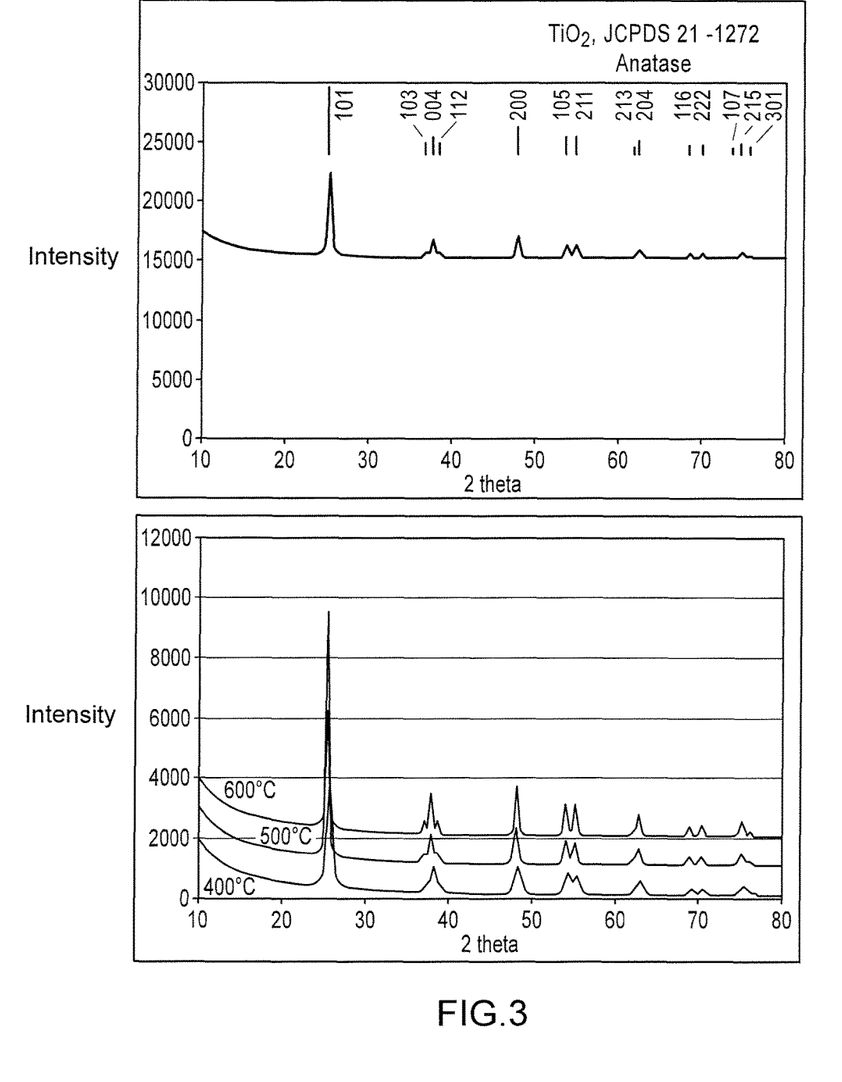
FIG. 3 illustrates an X-ray diffraction pattern of an anatase standard (top graph) and X-ray diffraction patterns of anatase titania particles produced using examples of the treatment method of the present invention, which include a baking step of 400° C., 500° C. or 600° C.

FIG. 3 shows the X-ray diffraction patterns of anatase titania produced by treating irregularly-shaped particles of titania using an example of the treatment method of the present invention, which includes a step of baking the titania particles at a temperature of 400° C., 500° C. or 600° C. The X-ray diffraction patterns suggest that larger crystals of anatase titania are formed within the particles of titania as the temperature of baking is increased from 400° C. to 600° C.

Figure 4A:
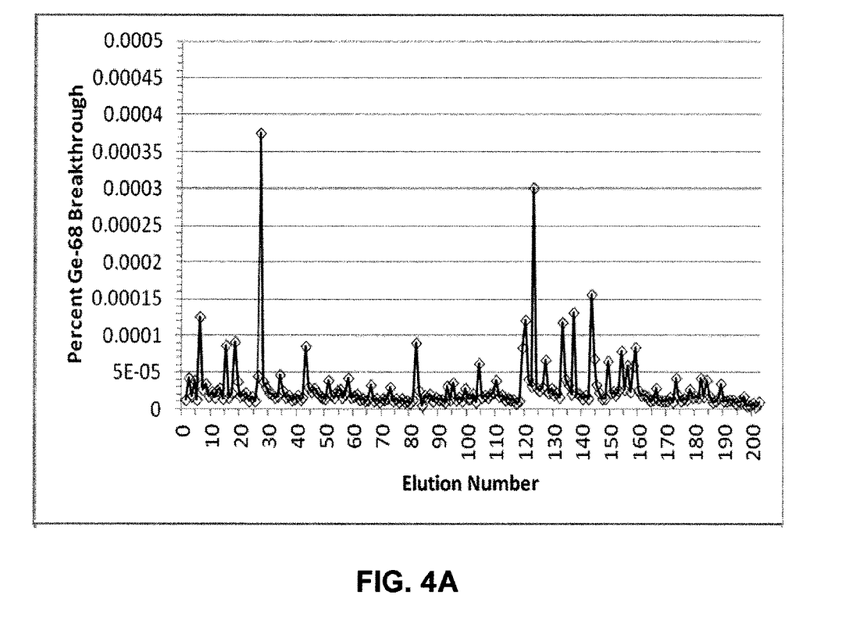
FIGS. 4A-B illustrate a plot of the amount of $^{68}$Ge breakthrough as a function of elution number and a plot of the values of percent yield of $^{68}$Ga as a function of elution number, respectively, based on eluted samples obtained with a 33 mCi radionuclide generator using irregularly-shaped particles of anatase titania adsorbent, which were pre-treated according to the treatment method of the present invention.

FIG. 4A illustrates the values of breakthrough of $^{68}$Ge measured in samples obtained by eluting a 33 mCi $^{68}$Ge/$^{68}$Ga generator according to the present invention with 0.1N HCl. The generator comprised irregularly-shaped particles of anatase titania adsorbent, which were pre-treated according to the example of the treatment method of the present invention described above. The spikes in values of breakthrough of $^{68}$Ge in the plot appear at times that immediately follow periods of days or weeks during which the generator was not in use. In a clinical setting, these particular eluted samples would be discarded. The appearance of these spikes in values of breakthrough of $^{68}$Ge is a common phenomenon with radioisotope generators involving long lived radionuclides, and may be caused by radiolysis of the particles of the adsorbent.

Figure 4B:
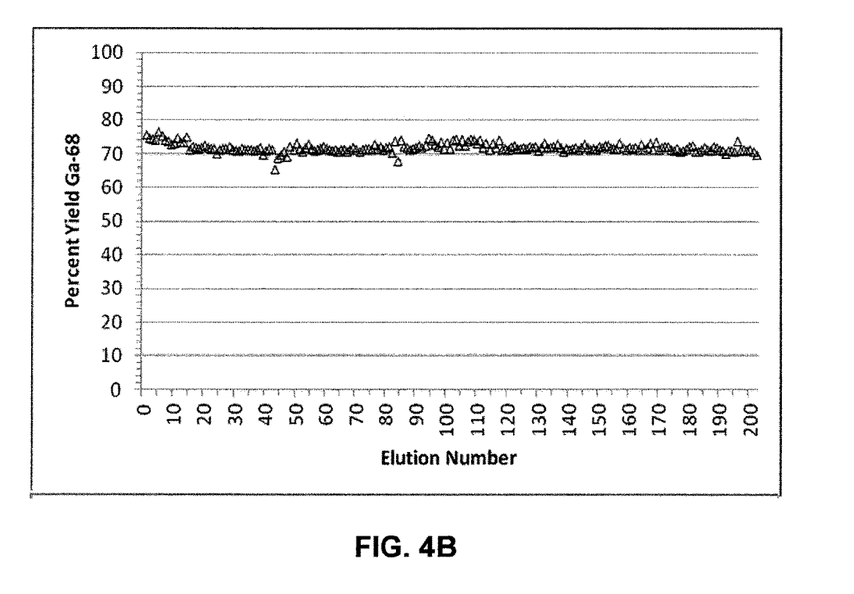

FIG. 4B illustrates the values of percent yield of $^{68}$Ga as a function of elution number in the same 33 mCi $^{68}$Ge/$^{68}$Ga generator. The value of percent yield for each eluted fraction was determined by dividing the actual amount of Ga-68 eluted from the generator, as measured using a dose calibrator, by the theoretical yield of Ga-68 for each fraction. The theoretical yield of Ga-68 for each fraction was calculated based on Ge-68 activity decay calculations and the time between elutions from the generator. The average value of percent yield of $^{68}$Ga for the eluted samples was 72%. The yield may be increased slightly to 75-80% by increasing the volume of eluent used to elute each sample from 5 mL to 10 mL, but will necessitate the use of a larger amount of base to neutralize each collected sample so that the isolated Ga-68 can be used for direct labelling.

Figure 5:
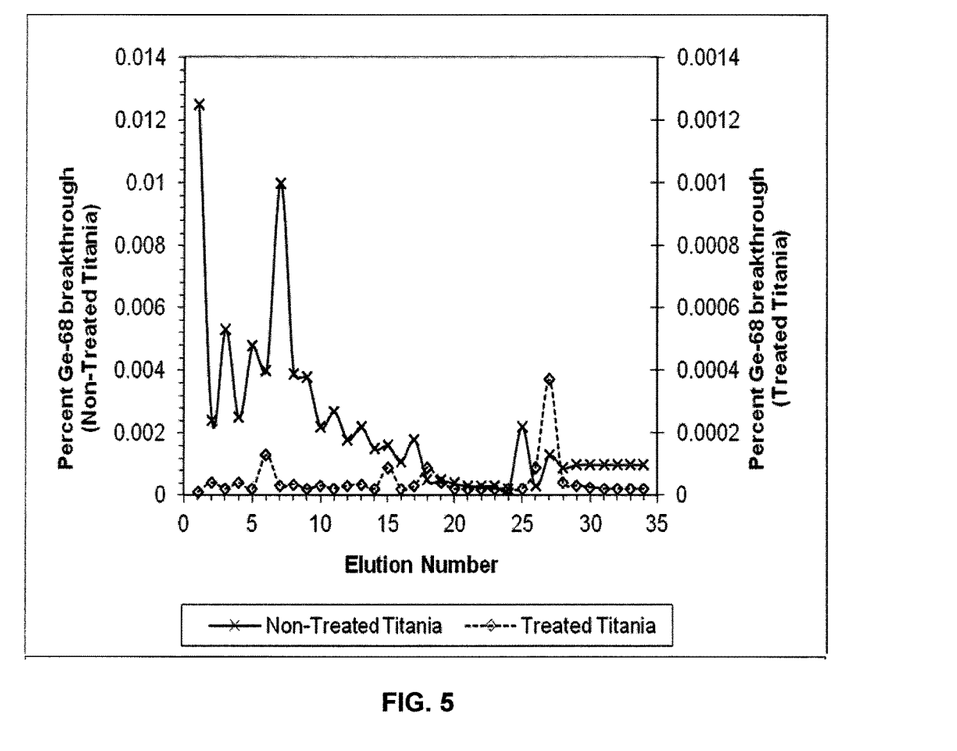
FIG. 5 illustrates the amount of $^{68}$Ge co-eluted with $^{68}$Ga (breakthrough) as a function of elution number based on elutions conducted with a) a 25 mCi radionuclide generator using untreated irregularly-shaped particles of anatase titania as adsorbent ("Non-Treated Titania") and b) a 33 mCi radionuclide generator using irregularly-shaped particles of anatase titania adsorbent that were pre-treated according to the treatment method of the present invention ("Treated Titania").

FIG. 5 illustrates a comparative plot of the first 34 values of breakthrough of $^{68}$Ge shown in FIG. 4A ("Treated Titania") and the values of breakthrough measured using a similar 25 mCi $^{68}$Ge/$^{68}$Ga generator that includes untreated irregularly-shaped particles of anatase titania as adsorbent ("Non-Treated Titania"). The average value of breakthrough observed using the generator having the treated titania was about 20 fold less than the average value of breakthrough observed using the same generator that included the untreated titania.

Without wishing to be limited by theory, it is believed that the reduced breakthrough observed with the use of the treated adsorbent of the present invention is at least in part a result of the reduction in the amount of fine particulate matter derived from use of the treated particles of the adsorbent containing adsorbed parent radionuclide, thereby reducing contamination of the eluted $^{68}$Ga with the parent radionuclide. The baking step included in the above example of the treatment method used to prepare the adsorbent for the radionuclide generator may also contribute to the observed reduced breakthrough by ensuring that the titania is predominately in the anatase crystal form.

One or more currently preferred embodiments have been described by way of example. It will be apparent to persons skilled in the art that a number of variations and modifications can be made without departing from the scope of the invention as defined in the claims.

What is claimed is:

1. A method of producing a treated chromatographic separation adsorbent, comprising:
   crystallizing titanium oxide or tin oxide in the presence of a base to form a crystalline metal oxide;
   drying the crystalline metal oxide to form a chromatographic separation adsorbent;
   sonicating the chromatographic separation adsorbent, in the absence of any alkylating or acylating agent to form sonicated particles of the crystalline metal oxide and fine particulate matter of the crystalline metal oxide;
   washing the sonicated particles of the crystalline metal oxide to remove the fine particulate matter of the crystalline metal oxide to produce a washed, treated chromatographic separation adsorbent; and
   drying the washed, treated chromatographic separation adsorbent, thereby producing the treated chromatographic separation adsorbent.

2. The method according to claim 1, wherein the chromatographic separation adsorbent is sonicated for a period of about 1 to about 4 hours.

3. The method according to claim 1, wherein the chromatographic separation adsorbent is sonicated for a period of about 1 to about 2 hours.

4. The method according to claim 1, wherein the sonicated particles of the crystalline metal oxide have a particle size of from about 10 μm to about 300 μm.

5. The method according to claim 1, wherein the crystalline metal oxide is titanium oxide, and wherein after the step of drying the treated chromatographic separation adsorbent is baked at a temperature of from about 400° C. to about 600° C. for about 1 to about 2 hours to produce a baked chromatographic separation adsorbent, the baked chromatographic separation adsorbent configured to reduce plugging of a filtration membrane in a chromatographic column.

6. The method according to claim 1, wherein the crystalline metal oxide is titanium oxide, and wherein after the step of drying the treated chromatographic separation adsorbent is baked at a temperature of from about 500° C. to about 600° C. for about 1 to about 2 hours to produce anatase titanium oxide.

7. The method as claimed in claim 1 further comprising a step of packing a chromatographic column with the treated chromatographic separation adsorbent.

8. A method of isolating a daughter radioisotope from a parent radioisotope, the daughter radioisotope produced from the parent radioisotope by radioactive decay, the method comprising:
   adsorbing the parent radioisotope onto the treated chromatographic separation adsorbent produced by the method according to claim 1 to produce a treated chromatographic separation adsorbent comprising an adsorbed parent radioisotope;
   allowing a portion of the parent radioisotope adsorbed on the treated chromatographic separation adsorbent comprising an adsorbed parent radioisotope to decay to the daughter radioisotope; and
   eluting a solution of the daughter radioisotope from the treated chromatographic separation adsorbent comprising an adsorbed parent radioisotope, thereby isolating the daughter radioisotope from the parent radioisotope.

9. The method according to claim 8, wherein the sonicated particles of the crystalline metal oxide have a particle size of about 10 μm to about 300 μm.

10. The method according to claim 8, wherein the chromatographic separation adsorbent is sonicated for a period of about 1 to about 4 hours.

11. The method according to claim 8, wherein the chromatographic separation adsorbent is sonicated for a period of about 1 to about 2 hours.

12. The method according to claim 8, wherein the crystalline metal oxide is titanium oxide, and wherein after the step of drying the treated chromatographic separation adsorbent is baked at a temperature of from about 400° C. to about 600° C. for about 1 to about 2 hours.

13. The method according to claim 8, wherein the crystalline metal oxide is titanium oxide, and wherein after the step of drying the chromatographic separation adsorbent is baked at a temperature of from about 500° C. to about 600° C. for about 1 to about 2 hours to produce anatase titanium oxide.

14. The method according to claim 8, wherein:
   i) the parent radioisotope is $^{68}$Ge and the daughter radioisotope is $^{68}$Ga;
   ii) the parent radioisotope is $^{82}$Sr and the daughter radioisotope is $^{82}$Rb;
   iii) the parent radioisotope is $^{99}$Mo and the daughter radioisotope is $^{99m}$Tc;
   iv) the parent radioisotope is $^{188}$W and the daughter radioisotope is $^{188}$Re;
   v) the parent radioisotope is $^{62}$Zn and the daughter radioisotope is $^{62}$Cu;
   vi) the parent radioisotope is $^{113}$Sn and the daughter radioisotope is $^{113m}$In;
   vii) the parent radioisotope is $^{228}$Th and the daughter radioisotope is $^{212}$Bi; or
   viii) the parent radioisotope is $^{225}$Ac and the daughter radioisotope is $^{221}$Fr.

15. The method according to claim 8, further comprising a step of grinding and sieving the crystalline metal oxide to a particle size of from about 10 μm to about 300 μm.

16. A method of isolating a compound of interest from a crude sample, comprising:
   crystallizing titanium oxide or tin oxide in the presence of a base to form a crystalline metal oxide;
   drying the crystalline metal oxide to form a chromatographic separation adsorbent;
   sonicating the chromatographic separation adsorbent in the absence of any alkylating or acylating agent to form sonicated particles of the crystalline metal oxide and fine particulate matter of the crystalline metal oxide;
   washing the sonicated particles of the crystalline metal oxide to remove the fine particulate matter of the crystalline metal oxide, to produce a washed, treated chromatographic separation adsorbent;
   drying the washed, treated chromatographic separation adsorbent, thereby producing a treated chromatographic separation adsorbent that reduces plugging of a filtration membrane in a chromatographic column; and
   using the treated chromatographic separation adsorbent in the chromatographic column to isolate the compound of interest.

17. The method according to claim 16, wherein the step of using comprises:
   adsorbing the compound of interest from the crude sample onto the treated chromatographic separation adsorbent to produce the treated chromatographic separation adsorbent comprising an adsorbed compound of interest; and
   a solution of the compound of interest from the treated chromatographic separation adsorbent comprising the adsorbed compound of interest, thereby isolating the compound of interest from the crude sample.

18. The method according to claim 16, wherein the crystalline metal oxide is titanium oxide, and after the step of drying the treated chromatographic separation adsorbent is baked at a temperature of from about 400° C. to about 600° C. for about 1 to about 2 hours, the treated chromatographic separation adsorbent configured to reduce plugging of the filtration membrane in the chromatographic column.

19. The method according to claim 16, wherein the crystalline metal oxide is titanium oxide, and wherein after the step of drying the treated chromatographic separation adsorbent is baked at a temperature of from about 500° C. to about 600° C. for about 1 to about 2 hours to produce anatase titanium oxide.

20. The method according to claim 16, wherein the chromatographic separation adsorbent is sonicated for a period of about 1 to about 4 hours.

21. The method according to claim 16, wherein the chromatographic separation adsorbent is sonicated for a period of about 1 to about 2 hours.

22. The method according to claim 16, further comprising a step of grinding and sieving the crystalline metal oxide to a particle size of from about 10 μm to about 300 μm.

* * * * *